UNITED STATES PATENT OFFICE.

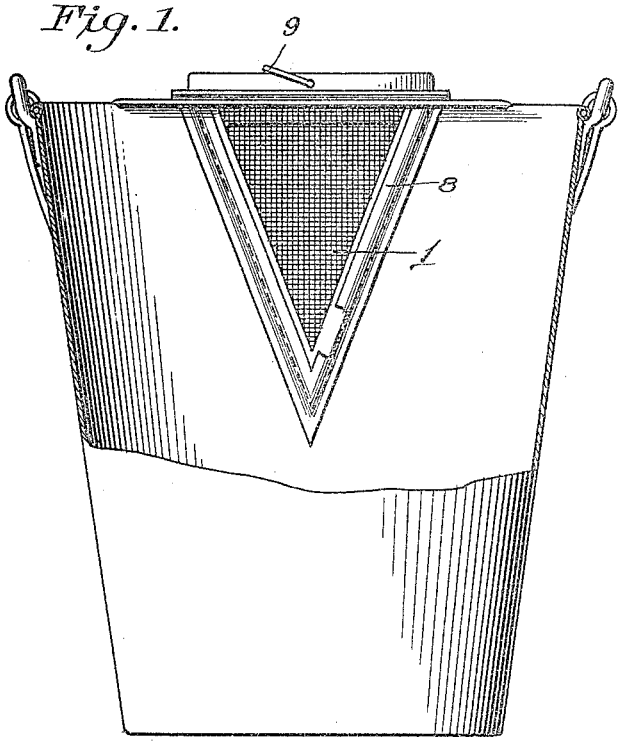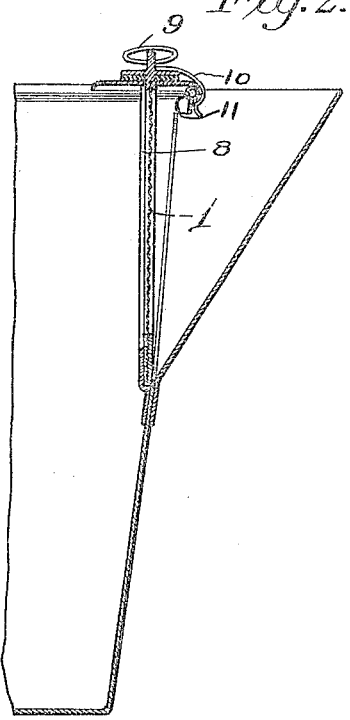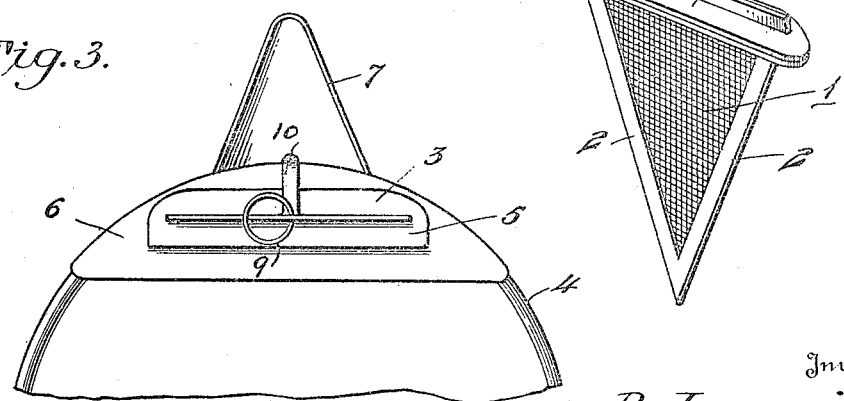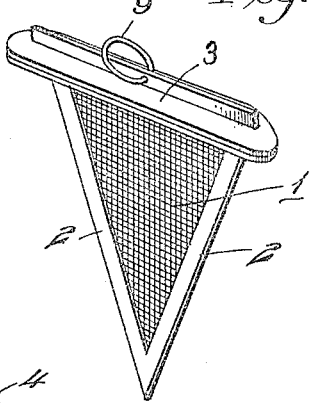

RUDOLF JOVANOVITZ AND ANTHONY LAMBERT, OF NEW ENGLAND, NORTH DAKOTA.

MILK-STRAINER.

1,231,374.            Specification of Letters Patent.        Patented June 26, 1917.

Application filed April 6, 1917. Serial No. 160,209.

*To all whom it may concern:*

Be it known that we, RUDOLF JOVANOVITZ and ANTHONY LAMBERT, subjects of the Emperor of Austria-Hungary, residing at New England, in the county of Hettinger and State of North Dakota, have invented certain new and useful Improvements in Milk-Strainers; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in strainers and it has for its object the provision of a simple, efficient and inexpensive strainer adapted to be readily placed in position in connection with a bucket or pail and as readily removed for cleaning or other purposes.

To this end and to such others as the invention may pertain, the same consists in the novel construction, peculiar arrangement, combination and adaptation of parts, all as will be more fully hereinafter described, shown in the accompanying drawings and then specifically defined in the appended claims.

Our invention is clearly illustrated in the accompanying drawings which, with the numerals of reference marked thereon, form a part of this specification and in which:

Figure 1 is a side elevation of a milk receptacle showing our strainer secured thereto, the upper portion of the receptacle being shown in cross section.

Fig. 2 is a vertical section through the strainer, showing its connection with the bucket.

Fig. 3 is a top plan view of the strainer shown in position.

Fig. 4 is a detail view of the strainer.

Reference now being had to the details of the drawings by numeral, 1 represents the strainer which is triangular in form and provided with metallic side strips 2, the outer edges of which strips consist of pieces of sheet metal, each bent along the line extending along its longitudinal center, and the screen is secured between the outer edges of the fold. The top 3 of the receptacle 4, to which the strainer is to be applied, is provided with a transverse opening of a width corresponding with the width of the upper portion of the frame, the extreme upper end of which extends through the opening and is provided with a flat portion 5 adapted, when the screen is inserted in said opening, to contact with the upper face of a metallic plate 6 which is permanently attached to the upper surface of the receptacle. 7 is the spout through which the milk, when strained, is removed from the receptacle.

The outer side edges 2 of the screen frame engage slots 8, as clearly shown in Fig. 1 of the drawings. 9 is a handle attached to the upper end of the screen frame and serves as a means for withdrawing the screen from its seat when it is desired to remove the same for cleaning or for other purposes.

In order to hold the screen in place, a finger 10 projecting from the top 3 is adapted to engage over a beading 11 around the top of the receptacle.

From the foregoing description, the operation of the invention will be at once readily understood. The screen is inserted through the transverse opening in the plate 6 of the receptacle and, when it is desired to remove the same, it can be readily withdrawn by means of the operating handle 9.

What we claim to be new is:—

1. A milk pail strainer, comprising a receptacle having a nose, the wall of the receptacle provided with an opening to permit liquid to pass from the receptacle into said nose, the top of the receptacle having a slot, a strainer passing through said slot and engaging the marginal edges of said opening, and means for holding the strainer in place in the receptacle.

2. A milk pail strainer comprising a receptacle having an opening in the wall thereof with a slot in the top, a strainer passing through said slot and having a strainer resting upon the top, the edges of the strainer adapted to conform to the shape of the opening, said receptacle having a beaded portion adjacent to the opening, and a finger projecting from said strainer and adapted to engage said beading.

3. A milk pail strainer comprising a receptacle with a nose and having an angular-outlined opening formed in the wall thereof and through which liquid is allowed to pass into the nose of the receptacle, a beading upon the receptacle adjacent to the upper edge of said opening, a triangular-shaped screen and frame in which the same is mounted, said frame having a laterally extending flange adapted to rest upon the top of the receptacle, the inclined edges of the frame adapted to engage the marginal edges of the opening, and a finger projecting from said strainer and engaging over said beading.

In testimony whereof we hereunto affix our signatures in presence of two witnesses.

RUDOLF JOVANOVITZ.
ANTHONY LAMBERT.

Witnesses:
CHARLES SIMON,
MILDRED GARDNER.

Copies of this patent may be obtained for five cents each, by addressing the "Commissioner of Patents, Washington, D. C."